Nov. 27, 1956 A. W. KEEN 2,772,358
SCANNING CIRCUITS FOR CATHODE RAY TUBES
Filed Feb. 9, 1952
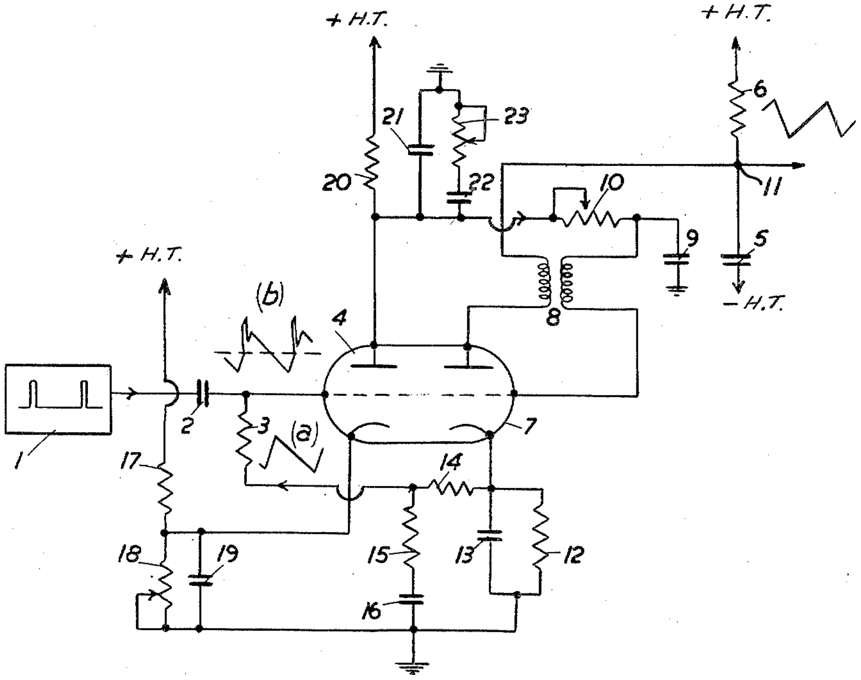
Inventor
ARTHUR WILLIAM KEEN
By Ralph E. Atherton
Attorney United States Patent Office 2,772,358

Patented Nov. 27, 1956

2,772,358

SCANNING CIRCUITS FOR CATHODE RAY TUBES

Arthur W. Keen, Coventry, England, assignor to Electric & Musical Industries Limited, Hayes, England, a British company Application February 9, 1952, Serial No. 270,852

Claims priority, application Great Britain February 16, 1951

2 Claims. (Cl. 250—36)

This invention relates to scanning circuits for cathode ray tubes and relates in particular to so-called flywheel scanning circuits such as are used in some forms of television receiver.

It is generally desirable, especially where heavy pulse interference is likely to be encountered, to employ so-called flywheel scanning circuits in television receivers. In such circuits, as is known, the frequency of a sawtooth waveform generator is determined by a free running oscillator and the frequency of this oscillator is in turn controlled by a voltage representative of smoothed variations in the timing of the generated sawtooth waveform with respect to incoming synchronising pulses. Such scanning circuits are less liable to disturbance due to interference by random noise impulses but nevertheless their increased cost compared with the more usual type of scanning circuits which are directly controlled by incoming synchronizing pulses has proved a deterrent against their general adoption.

The object of the present invention is to provide improved flywheel scanning circuits for cathode ray tubes, with a view to reducing the number of components required therein and therefore the cost of the circuits.

A further object of the present invention is to provide a flywheel scanning circuit for a cathode ray tube comprising a sawtooth waveform generator including an oscillator circuit for determining the periodicity of the generated sawtooth waveform, and means for controlling the frequency of said oscillator circuit, said means being operative to add incoming synchronising pulses to sloping portions on a periodic waveform having a frequency determined by the oscillator, and to control the frequency of the oscillator in response to variations in the elevation of the synchronising pulses on said sloping portions.

In order that the said invention may be clearly understood and readily carried into effect, the same will now be more fully described with reference to the accompanying drawing the single figure of which illustrates one example of a scanning circuit in accordance with the present invention.

Referring to the drawing, it will be assumed that the circuit illustrated is a line scanning circuit for the cathode ray tube of a television receiver and that line frequency synchronising pulses are received from the synchronising signals separator 1, which should preferably be of the double-limiting type, or followed by a limiter, in order to ensure a constant amplitude of the line synchronising pulses. The pulses from the synchronising signal separator, which is shown merely in block form, are applied via a coupling condenser 2 and resistance 3 to the control electrode of a control valve 4, which will be referred to in more detail subsequently. The circuit includes a sawtooth waveform generator which comprises a condenser 5, a resistance 6 for charging the condenser 5 relatively slowly from a source of positive potential denoted in the drawing by HT+ and a discharger valve 7 for periodically discharging the condenser relatively rapidly. The junction of the condenser 5 and resistance 6 is connected in known manner to the anode of the valve 7, and the valve 7 is arranged in a blocking oscillator circuit by virtue of regenerative coupling provided by a transformer 8 between its anode and control electrode circuits. The control electrode circuit also includes a time constant circuit consisting of a condenser 9 and a resistor 10 which is returned, as shown, to the anode of the detector valve 4, the resistor 10 being variable for frequency control. The output of the sawtooth waveform generator is obtained at the terminal 11 and applied in known manner through an output stage to the scanning coils of the cathode ray tube. A wave-shaping circuit is connected in the cathode lead of the valve 7 and this circuit comprises the parallel combination of resistance 12 and condenser 13, constituting an integrating circuit shunted by the series combination of resistances 14 and 15 and a condenser 16. The output of the wave-shaping circuit is taken from the junction of the resistances 14 and 15 and applied to the control electrode of the valve 4 via the resistance 3. The valve 4 is biased negatively by virtue of the connection of the cathode of this valve to a biasing network, consisting of resistances 17 and 18 and a condenser 19, connected as shown between the positive potential source of the circuit and ground. The anode circuit of the valve 4 comprises a load resistance 20 shunted by a smoothing network consisting of condensers 21 and 22 and a resistance 23.

In operation of the circuit described, a sawtooth waveform variation is set up in known manner at the terminal 11, the short flanks being generated by discharge of the condenser 5 through the discharger valve 7 when the latter valve is periodically unblocked by the action of the blocking oscillator circuit. The resultant periodic current pulses flowing through the valve 7 are integrated by the integrating circuit 12, 13 to form an approximate sawtooth waveform variation of the same periodicity as that set up at the terminal 11 but of opposite polarity, that is to say with its short flanks represented by a sharp increase in potential. This sawtooth waveform as modified by the addition of a parabolic component by virtue of the components 14, 15 and 16, is applied to the control electrode of the valve 4 as denoted by the waveform *a* in the drawing the chief purpose of the parabolic component being to control the slope of the short flanks of the waveform *a*. The synchronising pulses from the source 1 are added to the waveform *a* at the control electrode of the valve 4 to produce a resultant input signal as denoted by the waveform *b* and it is arranged that when the timing of the sawtooth waveform variation obtained at the terminal 11 is correctly related to the incoming synchronising pulses, these pulses occur at the middle of the short flanks of the waveform *a*. Moreover the bias on the valve 4 is adjusted as indicated by the dotted line in the waveform *b* so that the valve operates at the bottom bend of its characteristic and under equilibrium conditions, i. e. when the synchronising pulses sit on the middle of the short flanks of the waveform *a*, the peaks of these pulses extend to the middle of the grid base of the valve. By "grid base" is meant the range of grid voltages for which changes in grid voltage actually produce changes in anode current; i. e., for which the curve of anode current against grid voltage is not substantially horizontal. The resultant current pulses in the valve 4 set up a voltage across the resistance 20, which is smoothed by the network 21, 22, 23 and applied to the resistance 10, serving to maintain the blocking oscillator frequency at the correct valve. Initially, alignment of the blocking oscillator with the incoming synchronising pulses can be obtained by adjustment of the resistance 10. If, however, the timing of the generated sawtooth waveform should vary with respect to the incoming synchronising pulses the elevation of the synchronizing pulses on the waveform *a* varies and current in the valve 4 varies correspondingly, causing a variation in the control voltage set up at the anode of the valve 4. This variation in the control voltage applied to the resistance 10, in turn varies the frequency of the blocking oscillator in a sense to restore the alignment between the generated sawtooth waveform variation and the incoming synchronising pulses.

In the circuit described the valve 4 functions not only as an error-sensing valve but also as an amplifier and sets up an amplified representation of variations in the elevation of the synchronizing pulses whereby a high gain is achieved in the frequency control feedback loop from the oscillator valve 7. The valve 4 does not thus function as a peak detector or width discriminator. A single valve can thus be used where two valves would be used in conventional circuits employing peak detection, and sensitive frequency control is achieved with a minimum of components. The resistance 23 is variable to allow the feedback loop to be adjusted for critical damping while the resistance 18 is variable to allow of adjustment of the bias on the valve 4. The valves 4 and 7 are shown as enclosed in a single envelope and it is preferable for these valves to have separate cathodes so as to reduce the liability for the synchronising impulses to be fed to the blocking oscillator other than by the feedback loop. However, in some cases it may be possible to employ valves having a common cathode although in this case it would be necessary to connect the wave-shaping circuit 12 . . . 16 to the scanning circuit proper. According to one such modification, the cathodes of the valves 4 and 7 are grounded, and the junction of the elements 12, 13 and 14 connected to a point in the scanning circuit from which periodic current pulses are received. The resistance 17 of the biasing network is taken to a negative potential source, instead of a positive source as in the figure, and the junction of the resistances 17 and 18 is connected by a large resistance to the lower end of the resistance 3. The circuit is otherwise the same as that illustrated in the drawing.

It will be appreciated that the invention is not limited to line scanning circuits nor to scanning circuits for use in television receivers.

What I claim is:

1. A flywheel scanning circuit suitable for a cathode ray tube, comprising an oscillator including an oscillator valve having a control electrode and a cathode, and voltage responsive frequency control means connected to said control electrode for determining the natural frequency of said oscillator, a control valve having at least an anode, a control electrode and a cathode, means connected to the cathode of said oscillator valve for deriving a sawtooth waveform having a frequency determined by said oscillator, a source of controlling pulses of positive polarity, a control electrode-to-cathode circuit for said control valve including circuit connections for simultaneously applying said controlling pulses and said sawtooth waveform to said control electrode-to-cathode circuit, said control electrode-to-cathode circuit including biasing means predetermined to cause the peaks of said controlling pulses to lie within the grid base of said control valve, thereby to produce current intensity variations in said control valve in response to variations in the elevation of said pulses, an output load connected to the anode of said control valve, and means for applying the voltage variations across said output load to said frequency control means for controlling the frequency of said oscillator to maintain the incoming controlling pulses at an intermediate point on the short flanks of said sawtooth waveform, said voltage variations being an amplified representation of variations in the elevation of said controlling pulses on said short flanks.

2. A circuit in accordance with claim 1, in which said oscillator is a blocking oscillator and in which the means for deriving a sawtooth waveform comprises an integrating circuit in the cathode circuit of the oscillator valve.

References Cited in the file of this patent

UNITED STATES PATENTS

| | | |
|---|---|---|
| 2,235,131 | Wheeler | Mar. 18, 1941 |
| 2,344,810 | Fredendall et al. | Mar. 21, 1944 |
| 2,418,425 | Poch | Apr. 1, 1947 |
| 2,458,156 | Fredendall | Jan. 4, 1949 |
| 2,460,112 | Wright et al. | Jan. 25, 1949 |
| 2,585,930 | Gruen | Feb. 19, 1952 |
| 2,633,555 | Tourshou | Mar. 31, 1953 |
| 2,654,033 | Dome | Sept. 29, 1953 |